(No Model.)
L. A. ASPINWALL.
PLANTER FOR COTTON OR OTHER SEEDS.
No. 387,279. Patented Aug. 7, 1888.
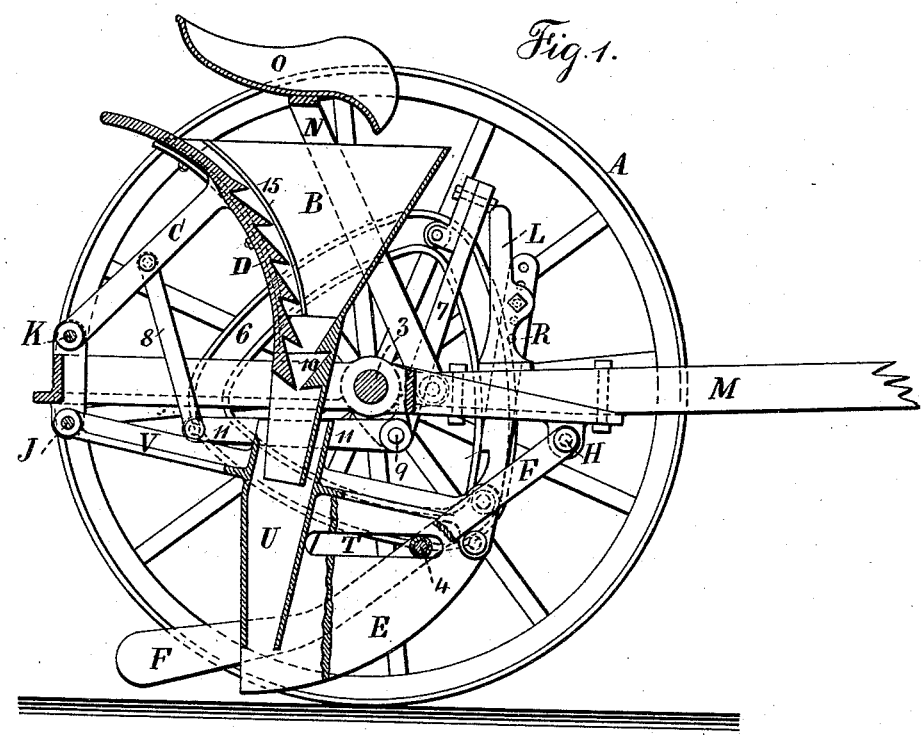
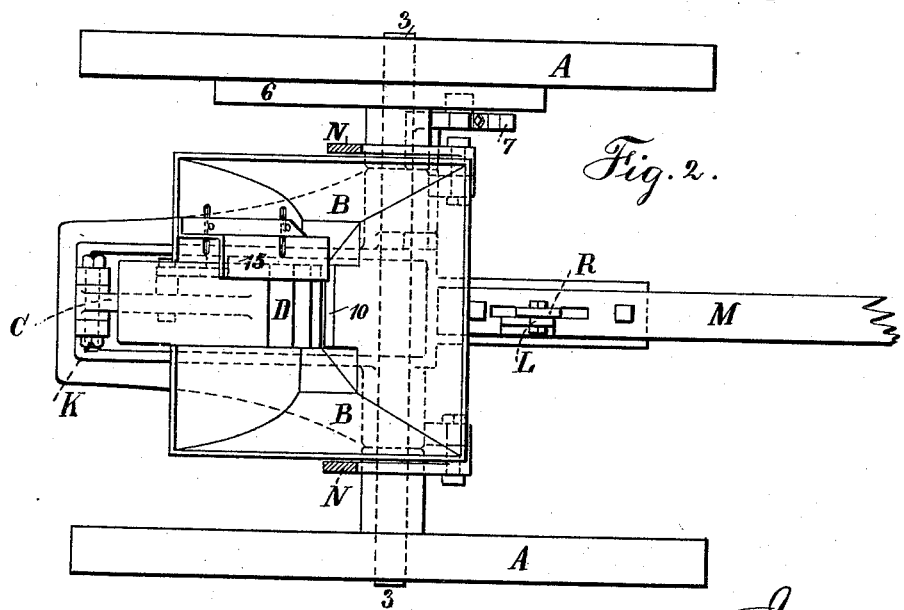
Witnesses:
J. Stail
Chas H Smith
Inventor:
Lewis Augustus Aspinwall,
per Lemuel W. Serrell, Atty.

United States Patent Office.

LEWIS AUGS. ASPINWALL, OF THREE RIVERS, MICHIGAN.

PLANTER FOR COTTON OR OTHER SEEDS.

SPECIFICATION forming part of Letters Patent No. 387,279, dated August 7, 1888.

Application filed April 30, 1888. Serial No. 272,218. (No model.)

*To all whom it may concern:*

Be it known that I, LEWIS AUGUSTUS ASPINWALL, of Three Rivers, in the county of St. Joseph and State of Michigan, have invented an Improvement in Planters for Cotton, &c., of which the following is a specification.

This machine is especially intended for planting cotton; but it may be made use of in discharging fertilizing material periodically. In planting cotton the seeds are frequently mixed with fertilizing material, and they are generally fuzzy upon their surface and adhere to one another.

The object of the present invention is to separate the seeds from the mass or to separate the fertilizing material from the mass in the hopper and discharge the same with regularity and in uniform quantities, or nearly so, as the machine is drawn along upon the ground.

In the drawings, Figure 1 is a sectional elevation of my improved machine; and Fig. 2 is a plan view of the same, the seat being removed.

The wheels A are connected to the axle 3 in the usual manner by ratchet-wheels and pawls, so that such axle revolves with the wheels when the machine is drawn forward.

M is the tongue or pole, connected at its back end to the frame of the machine, and E is a plow or furrow-opener, the forward end of which is fastened to the radius-bar V, that is hinged at its back end by the pivot J to the frame of the machine, and at the top front end of the plow is the link R, connected to the lever L, that rests upon the tongue M, by means of which the driver upon the seat O can raise or lower the plow E at will; and there are coverers, F, hinged at their front end, H, to the under side of the frame of the machine, and these coverers F drag upon the surface of the earth and throw the same back into the furrow, so as to cover the seeds or other materials that have been dropped into the furrow; and in the plow there is a slot, T, through which passes the bolt 4, that is surrounded by a tube or sleeve, and this bolt 4 connects the two coverers F together, and the slot in the plow allows the coverers to rise and fall to a limited extent, and when the plow is lifted by the lever L the coverers also are lifted.

The seat O is supported by the standards N, preferably hinged at their lower ends so as to allow the seat to be swung forward to give access to the hopper B. This hopper B is supported upon the frame, and is of a suitable size adapted to receive the cotton seed or other material to be acted upon; and in the back portion of this hopper is a vertical slot, within which is a toothed segment, D, the teeth of which are upon the front surface and within the hopper; and this toothed segment D is upon an arm or lever, C, pivoted at K to the frame, and to this toothed segment a limited reciprocating motion is given by a suitable cam, 6, upon the axle 3, that acts upon a lever, 7, on the shaft 9. Another lever, 11, on this same shaft is connected by the link 8 to the arm C, the levers and link being arranged in whatever position is the most convenient for the other parts of the apparatus, and at 10 there are stationary teeth in the lower portion of the hopper-throat and opposite to the teeth of the segment D. It will now be understood that as the toothed segment D is reciprocated its teeth carry down the cotton-seed or other material in the hopper past the stationary teeth 10, and such materials drop away through the spout or chute U into the furrow behind the plow E, and as the toothed segment rises the stationary teeth 10 insure a removal from the teeth of the reciprocating segment of the cotton seeds or other materials that have been carried below such teeth 10, and the teeth of the segment tend to pull down into the lower part of the hopper the cotton-seeds or other materials within the hopper.

I prefer to make use of a sliding shield, 15, which is of a curved shape corresponding to the curvature of the toothed segment, and this shield may be adjusted laterally, so as to cover the teeth of the segment more or less and thereby vary the extent of the toothed surface that receives the cotton-seeds or other materials to be planted. This curved shield may be fastened at one side of the hopper, so as to be moved out, more or less, over the surface of the teeth, and it is preferable to make the side of the hopper adjacent to the curved segment in the form of a segment of a cylinder corresponding to the curvature of the curved segment, so that there will be no risk of the materials dropping away through the slot containing the curved segment.

I claim as my invention—

1. The combination, with the wheels and axle and the hopper and plow, of a curved toothed segment within and at one side of the hopper, and means for reciprocating the segment so as to cause the teeth thereof to drop down and discharge the materials of the hopper progressively, substantially as set forth.

2. The combination, in a planter, of a hopper for containing the material to be planted, a plow for opening the furrow, a bar, V, pivoted at its rear end to the frame of the machine, a link and lever for raising or lowering the plow, coverers pivoted at their front ends to the frame of the machine, and a bolt connecting the coverers and passing through a slot in the plow, substantially as set forth.

3. The combination, with the hopper in a planter for cotton or other materials, of the toothed segment, an arm and pivot upon which the same are moved, and stationary teeth within the hopper and standing in opposite direction to the teeth of the segment for causing the delivery of the cotton-seed or other material from the teeth of the segment, substantially as set forth.

Signed by me this 14th day of April, 1888.

L. AUGS. ASPINWALL.

Witnesses:
 WALTER ALEXANDER,
 D. W. THAYER.